No. 801,621. PATENTED OCT. 10, 1905.
J. B. WALKER.
AUTOMATIC PIANO PLAYER.
APPLICATION FILED MAR. 8, 1904.

WITNESSES:
A. A. Hopkins
Waldemar B. Kaempffert

INVENTOR
John B. Walker
BY
ATTORNEYS

No. 801,621. PATENTED OCT. 10, 1905.
J. B. WALKER.
AUTOMATIC PIANO PLAYER.
APPLICATION FILED MAR. 8, 1904.

WITNESSES:
A. A. Hopkins
Waldemar B. Kaempffert

INVENTOR
John B. Walker
BY Munn & Co.
ATTORNEYS

UNITED STATES PATENT OFFICE.

JOHN B. WALKER, OF NEW YORK, N. Y.

AUTOMATIC PIANO-PLAYER.

No. 801,621.   Specification of Letters Patent.   Patented Oct. 10, 1905.

Application filed March 8, 1904. Serial No. 197,148.

*To all whom it may concern:*

Be it known that I, JOHN B. WALKER, a citizen of the United States, and a resident of the city of New York, borough of Manhattan, in the county and State of New York, have invented a new and Improved Automatic Piano-Player, of which the following is a full, clear, and exact description.

My invention relates to musical instruments and to appliances for actuating the same and admits of general use, but is of peculiar value in instances where the playing is partially automatic and partially under manual control of the operator.

In order to exhibit the structure and operation of my invention, I show one form of it as applied to a piano-player of the so-called "pianola" type.

Reference is made to the accompanying drawings, forming a part of this specification, in which like characters indicate like parts.

Before entering upon a detailed description of the mechanism and in order to enable the invention to be readily understood I will call attention to certain recognized difficulties attending the use of piano-players heretofore employed. In the rendering of music it is generally desirable that the theme, air, melody, or other desired portions of the music be expressed with a different emphasis from the accompaniment or remainder of the music. I am well aware that various attempts have been made to do this either by automatically increasing the tension through which the theme notes are struck or by providing two separate degrees of tension and automatic means for striking the theme notes with a high-tension and the accompaniment notes with a low-tension effect, or vice versa, the force with which the notes are struck being determined automatically by the positions of the music-sheet perforations. Now the limitation of all such devices is that the relative degree of tension with which the theme notes and the accompaniment notes are struck is fixed and unchangeable, the theme being always louder or softer than the accompaniment by a definite amount, whereas to secure the best rendition of a musical composition it is often desirable to vary the relative strength or emphasis with which the theme and accompaniment are played, sometimes the accompaniment or certain parts of it being louder than the theme and sometimes both theme and accompaniment being played with the same intensity. Now while the latter effects are possible in playing the piano by hand they are impossible, as far as I know, with any of the existing piano-playing devices, and it is one of the objects of my invention not only to provide means for separating the theme from the accompaniment, but to provide also means for the separate control, at the will of the operator, of the intensity with which both theme and accompaniment are played, so that both may be played simultaneously and independently with any desired degree of intensity from pianissimo to fortissimo. Indeed, by my invention any variation of the relative intensity of theme and accompaniment may be produced that is possible in playing the piano by hand.

It is to be distinctly understood that the word "theme" as used in this specification and the appended claims is not intended to be exclusive of such other portions of the music as I may wish to include in the same expression control as that of the theme.

Another object of my invention is to provide means by which this improved control of the expression may be secured with fewer levers than are now commonly used. For controlling the expression I employ a movement that admits of a "touch" corresponding in direction, sensitiveness, and rapidity to the stroke of the fingers in hand-playing. In other words, I bring the apparatus into conformity with the natural instinct of the operator to strike vertically downward with his hand and to strike with a vigor proportional to the intensity desired in the expression of the music.

Figure 1:
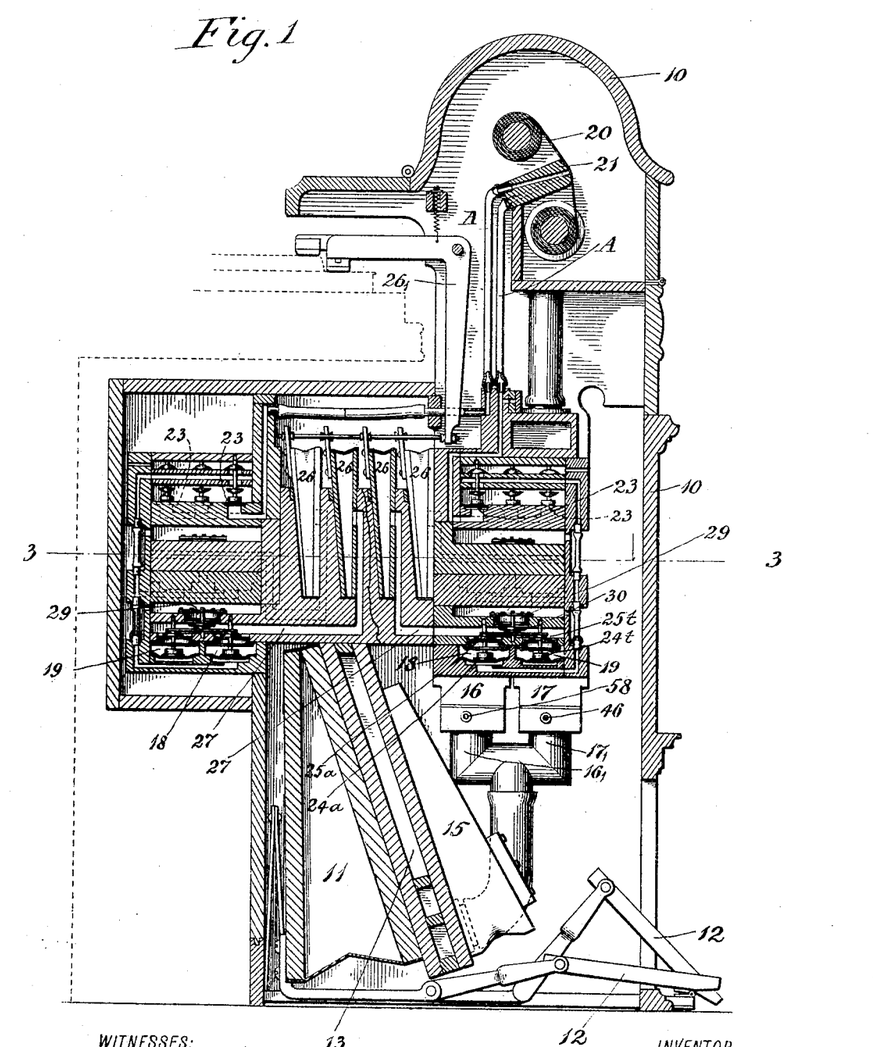
Figure 1 is a central vertical section through the piano-player upon the line 1 1 in Fig. 2 looking in the direction of the arrows.
Figure 2:
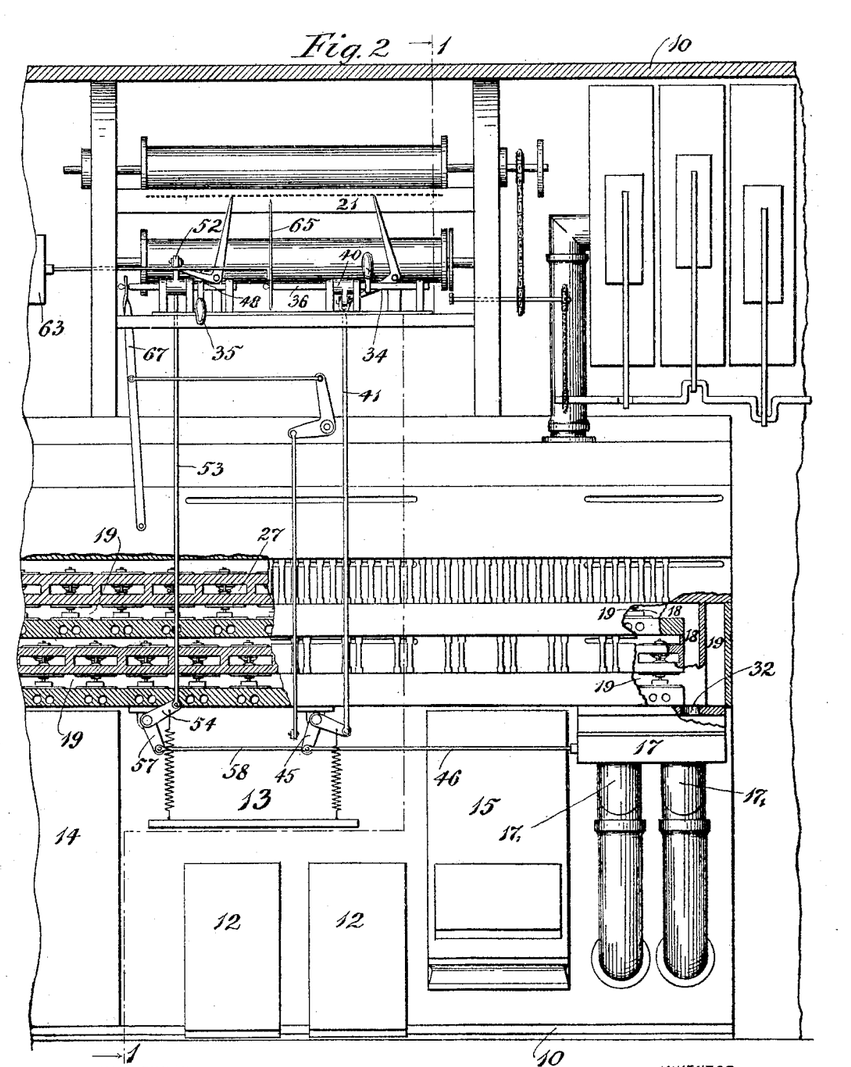
Fig. 2 is a fragmentary front elevation of the same, the front wall being removed for the sake of clearness.

Referring to the drawings showing a pneumatic piano-player, 10 represents the cabinet or outer casing, within which the operative mechanism is inclosed, the rear of this cabinet being so constructed as to admit the keyboard of a piano, as indicated by dotted lines in Fig. 1.

11 represents the exhaust-bellows operated by the treadles 12 to produce a partial vacuum in the main exhaust-chamber 13.

14 and 15 are regulating-bellows. 16 and 17 are two similar but separate expression-boxes, which are interposed between the secondary exhaust-boxes 18 and 19, respectively, and the said regulating-bellows for the purpose of controlling the degree of pneumatic tension in the said secondary exhaust-boxes.

Figure 6:
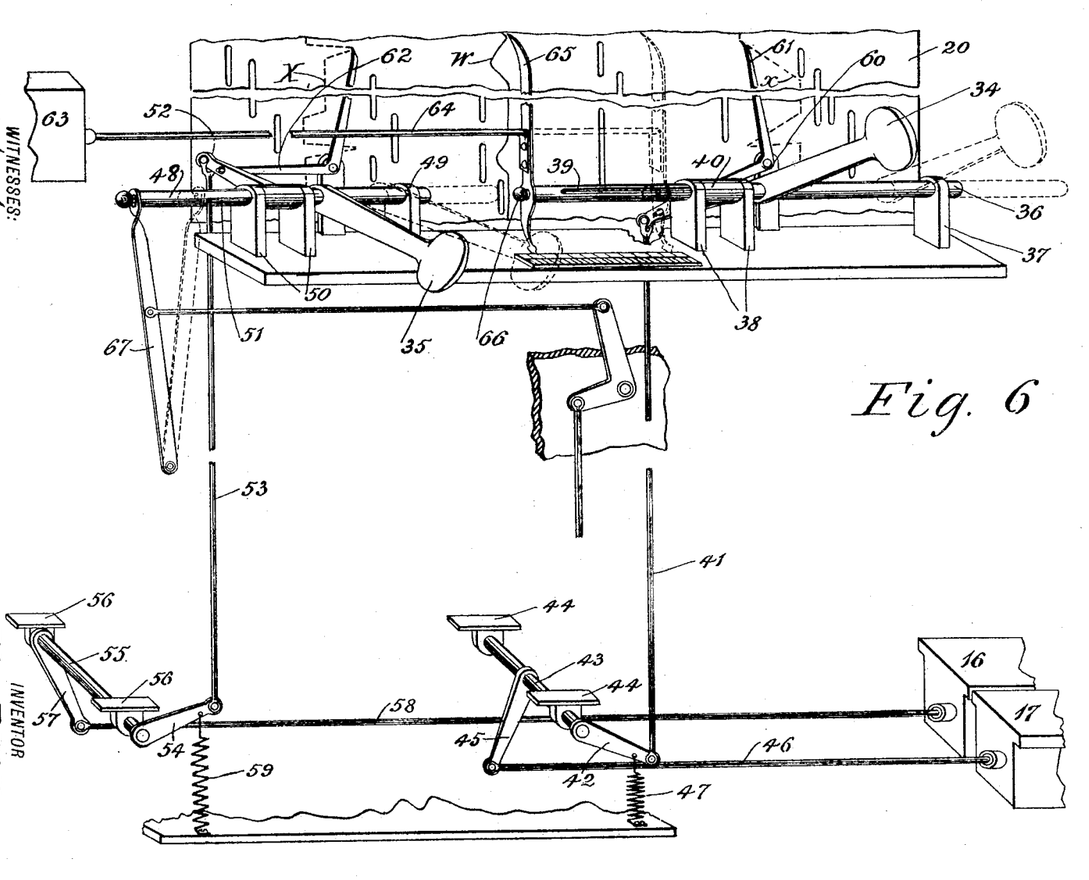
Fig. 6 is a perspective showing in detail and upon a larger scale divers of the parts shown in Fig. 2.
Figure 7:
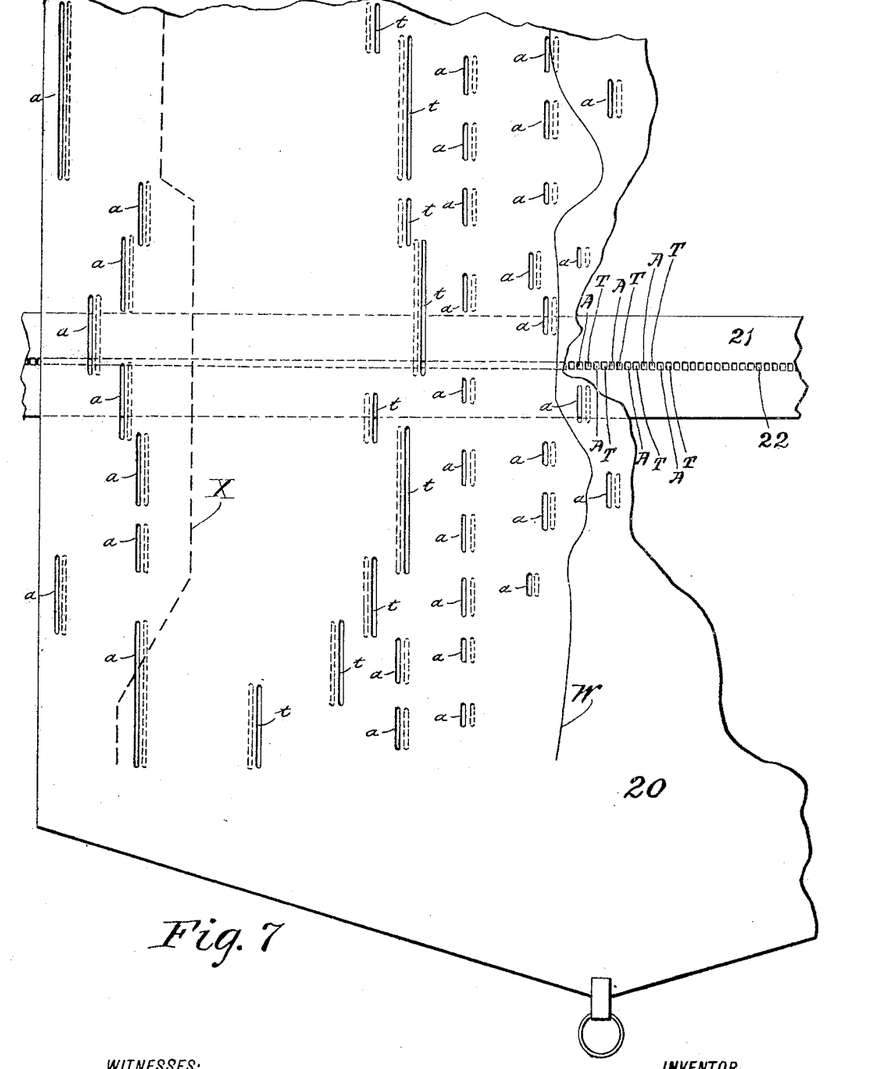
Fig. 7 is a fragmentary elevation of the music-sheet, showing the style of perforations employed.
Figure 8:
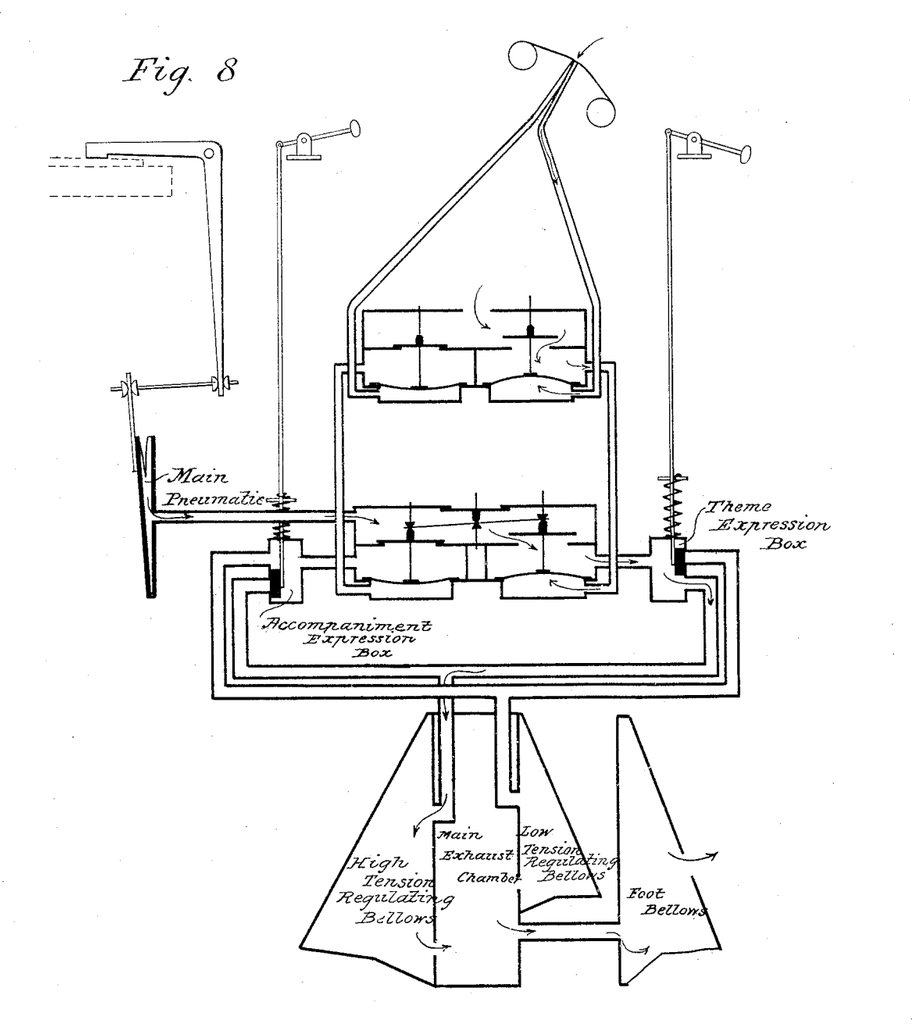
Fig. 8 is a diagram showing the relation of the several pneumatics to the various parts coacting therewith.

20, Figs. 1, 6, and 7, denotes the perforated music-sheet, which is wound in the usual manner from one roll to another over the tracker-board 21, which is provided with the ducts A and T, communicating with the primary or controlling-pneumatics 23, which control the secondary pneumatics $24^a$ and $24^t$, in accordance with the design of the music-sheet perforations.

The arrangement of the perforations in the music-sheet is illustrated in Fig. 7. As shown in this figure, the perforations for any given note can occupy either of two positions. (Shown, respectively, by dotted and full lines.) It should be borne in mind that in the ordinary form of piano-player tracker-board there is one duct for each key to be struck, and the music-sheet perforations are cut so as to register with these ducts. In the present invention, however, I provide a pair of separate ducts for each key to be struck, and the music-sheet perforations for any given note are cut so as to register either with the right-hand duct T or the left-hand duct A, Fig. 7, of each pair, as may be desired. Preferably the theme-note perforations are cut to register with the right-hand ducts or channels and the accompaniment-perforations to register with the left-hand ducts. In Fig. 7 the perforations are shown in full lines, some of them occupying the right-hand position $t$ and others the left-hand position $a$, the alternative positions for each note being shown in dotted lines. The right-hand ducts T connect with their respective primary pneumatics 23, so as to operate the secondary pneumatics $24^t$, and similarly the left-hand ducts A connect with their respective primary valves 23 so as to operate the secondary pneumatics $24^a$.

When pneumatic $24^t$ is actuated, it lifts the controlling-valve $25^t$, thereby connecting the main pneumatic 26 through channel 27 with the secondary exhaust-box 19. Similarly, pneumatic $24^a$ operates to lift valve $25^a$, thereby connecting the same pneumatic 26 with the secondary exhaust-box 18. The opening of either of these two valves deflates the main pneumatic with a force corresponding to the degree of tension of the particular secondary exhaust-box with which through said valve it is connected. When the main pneumatic is deflated, it acts through a bell-crank lever 26' to strike the corresponding key of the piano. The main pneumatic is held in the deflated position until the valve closes in the usual manner.

Figure 5:
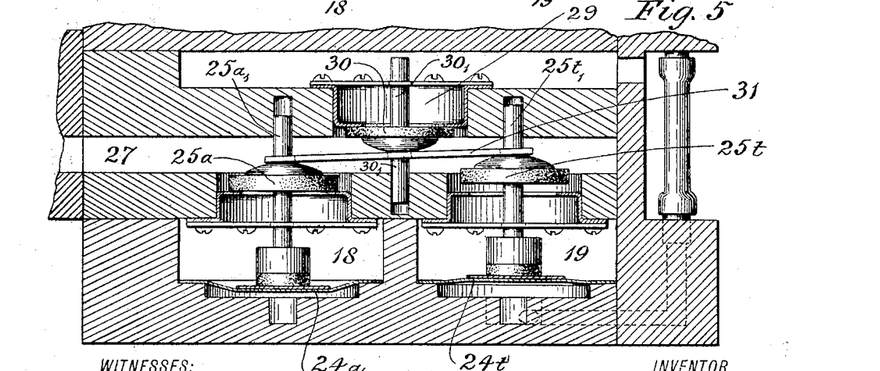
Fig. 5 is a vertical section otherwise similar to the lower part of Fig. 4, showing the secondary pneumatics and double-acting levers connected therewith.

In order to insure the inflation of the main pneumatic, I provide a vent 29, leading directly to the atmosphere. This vent is located in the upper wall of the passage 27 centrally between the controlling-valves $25^a$ and $25^t$ and is governed by a valve 30. It is evident that for the proper deflation of the main pneumatic 26 whenever either of the controlling-valves $24^a$ or $24^t$ is lifted the vent 29 must be closed, which is effected by means of a lever 31. This lever, which preferably consists of a thin strip of light material, is perforated at its center to receive the stem 30' of valve 30 and is slotted at its ends to engage the valve-stems $25^{a'}$ and $25^{t'}$ of valves $25^a$ and $25^t$, the valves and lever being so adjusted that when valves $25^a$ and $25^t$ are closed valve 30 shall be open and when valve $25^a$ or valve $25^t$ lifts and opens it shall through the medium of lever 31 lift and close valve 30. Fig. 5 shows the valve $25^t$ raised and holding the valve 30 against its seat by means of the lever 31, which at the left-hand end rests on valve $25^a$ as a fulcrum. When the valve $25^a$ is raised, the valve 30 is similarly held against its seat by the lever 31, which in this case finds a fulcrum on valve $25^t$.

Figure 3:
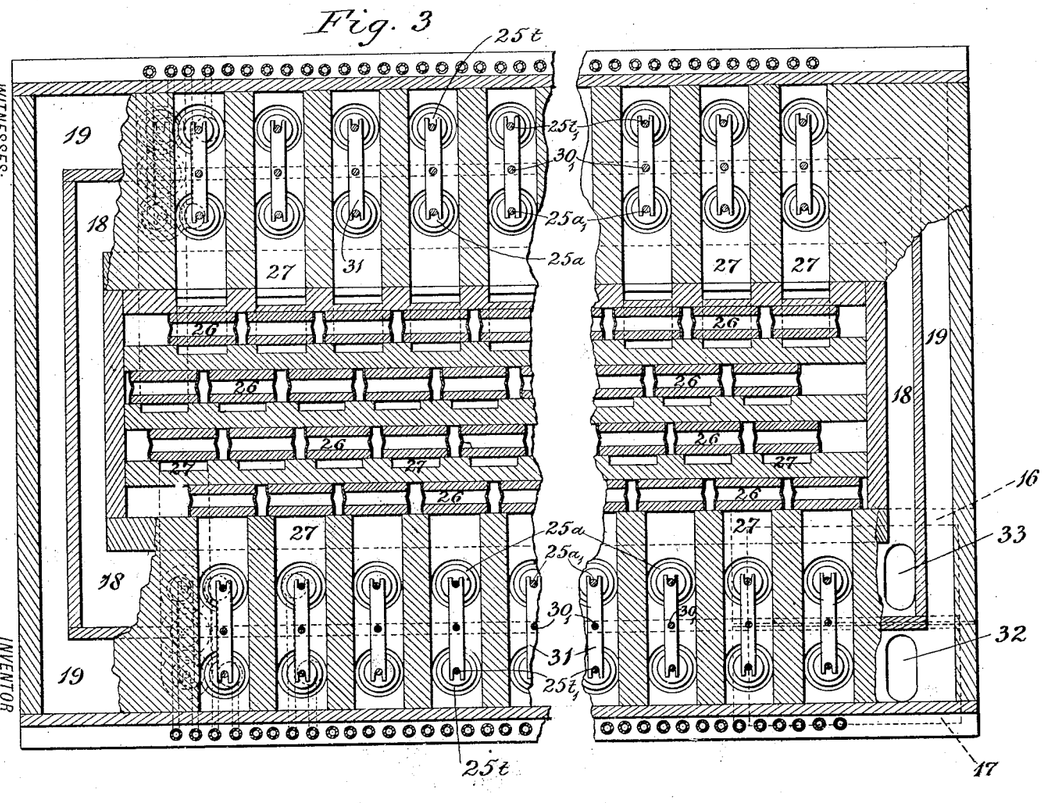
Fig. 3 is a fragmentary horizontal section upon the line 3 3 of Fig. 1 looking in the direction of the arrow.
Figure 4:
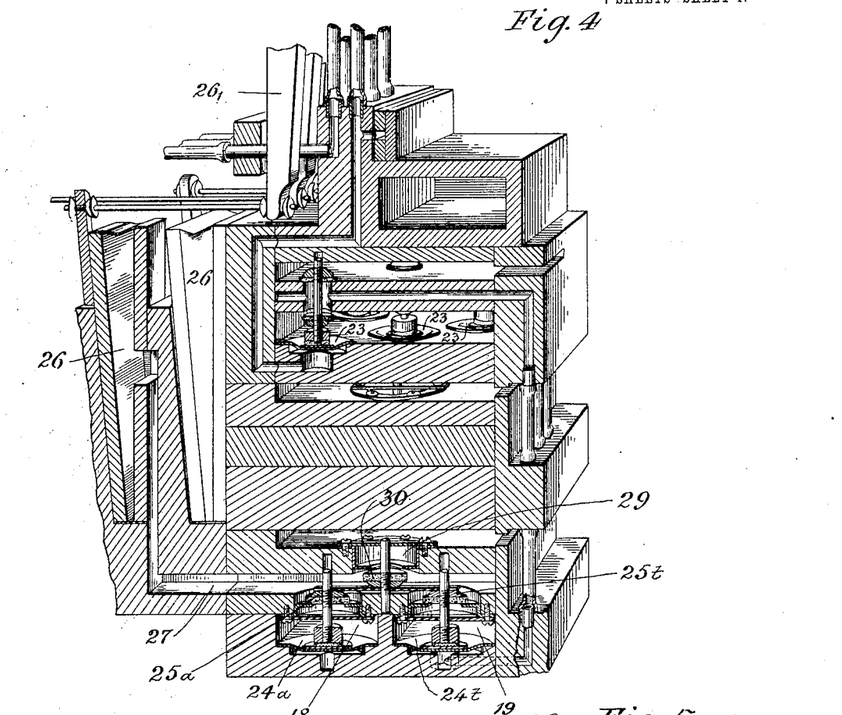
Fig. 4 is an enlarged sectional perspective otherwise similar to the central part of Fig. 1, showing a part of the main, primary, and secondary pneumatics.

The secondary pneumatics are preferably arranged in four banks, there being two independent banks at the front and two at the back of the machine, as shown. The set of controlling-valves $25^t$, corresponding to the right-hand set of ducts T on the tracker-board, is arranged, as shown in Fig. 3, toward the outer side of the machine, and the secondary exhaust-box 19, with which they communicate, extends entirely around the machine and opens through a port 32 into the expression-box 17. Similarly, the set of controlling-valves $25^a$, corresponding to the left-hand set of ducts A on the tracker-board, are arranged, as shown in Fig. 3, in the same planes parallel and adjacent to the controlling-valves $25^t$, and the secondary exhaust-box 18, with which they communicate, extends around the machine, its outer wall being integral with the inner wall of the secondary exhaust-box 19, as shown in Fig. 3. The secondary exhaust-box 18 communicates through a port 33 with the expression-box 16 and box 19 by port 32 with box 17.

It is clear that since each secondary exhaust-box is governed by its own expression-box it is possible by the operation of the said expression-boxes to produce at will any desired tension in either exhaust-box. Moreover, by perforating the music-sheet so that the theme notes lead, say, to exhaust-box 19 and the accompaniment-notes to exhaust-box 18 it is possible to play the theme and the accompaniment with independent expression, the strength and variation of which may be determined at the will of the operator through his control of the expression-boxes. Therefore it is possible with this arrangement of parts to play the accompaniment pianissimo and the theme mezzo-forte or the accompaniment mezzo-forte and the theme fortissimo, or both theme and accompaniment can be played pianissimo or fortissimo. Any successive group of notes, either in the theme or accompaniment, or both, and chosen arbitrarily at will may be caused to produce crescendo or diminuendo. In fact, almost any variation of expression is possible that can be produced in playing by hand. The introduction of two expression-boxes, each requiring separate control, however, calls for a simplification of the present methods of manipulating the operating-levers. This I achieve by means of two levers 34 and 35, each having a movement in two planes, horizontal and vertical. Lever 34 is secured to a horizontal bar 36, which is journaled in bearings 37 and 38. This bar is provided with a keyway 39. Pivoted on the bar 36, between bearings 38, is a lever 40, which is provided with a key adapted to engage the keyway 39. A rod 41 connects the outer end of lever 40 with lever 42 on the rock-shaft 43, which is journaled in the brackets 44. Secured to this rock-shaft 43 is a lever 45, which is connected by a rod 46 with the expression-box 17. A spring 47 acting on lever 42 tends to hold the regulating-valve normally in the closed or low-tension position corresponding to pianissimo. Similarly, lever 35 is secured to a horizontal bar 48, which is journaled in bearings 49 and 50 and is provided with a keyway 51. Pivoted to this bar between the bearings 50 is a lever 52, provided with a key engaging the keyway 51. The rod 53 connects the outer end of lever 52 with lever 54, secured to the rock-shaft 55, which is journaled in the bearings 56. The lever 57 is secured to this rock-shaft and is connected by rod 58 with the expression-box 16. In Fig. 6 the lever 35 is shown in the depressed position against the tension of spring 59, the valve in box 16 being moved into the open position corresponding to fortissimo. It is evident that as the levers 34 and 35 are held normally in the upper or low-tension position and are depressed at will the force with which the key of the piano is struck will vary according to the force with which the levers are depressed, and the movement being vertical and downward and the rise of the lever struck being automatic there is a close approximation to the effect of striking of the notes of the piano-keyboard by hand. Pivoted to a bracket 60 is a bell-crank lever 61, the lower arm of which engages a hole in the lever 40. The upper arm forms a pointer which, as the lever 34 moves vertically, is caused to move horizontally across the face of the music-sheet. The object of this lever is to enable the operator to follow with the pointer a line $x$ on the music-sheet, indicating the proper variations of expression to be given to the theme through the expression-box 17. Similarly a pointer 62 provides means for following an expression-line X on the music-sheet, showing the operator the proper variation of expression to be given to the accompaniment through the expression-box 16. I show at 63 a box for regulating the tempo. The so-called "time-line" is shown at W, and the pointer 63 is caused to follow it by manual manipulation of the lever 34. The stem 64 of the tempo-valve is secured to a pointer 65, which is perforated near its lower end and loosely connected with the bar 36 by a screw 66. The lateral movement of the lever 34 and the bar 36 serves to operate the tempo-valve in box 63. For the operation of the "loud" pedal on the piano I provide a lever 67, which is loosely connected to the bar 48 by a screw passing through an eye formed in the upper end of the said lever. This lever is connected in any desired way with the loud pedal of the piano and may be operated by the lateral movement of the lever 35, acting through the bar 48. It will thus be seen that the separate control of the theme and the accompaniment and also the control of the tempo and the loud pedal are secured by the manipulation of the two levers 34 and 35.

An analysis of the art of mechanical piano-player construction shows that mechanical piano-players comprise in themselves purely automatic elements and manually-controlled elements. To the former broadly belong the tracker-board and the pneumatic mechanisms for striking the notes. The latter include the elements of interpretation—namely, the tempo devices, the mechanisms for controlling the loudness of the notes, and the loud pedal for sustaining the notes. It is these last-named elements that enable a player to interpret the music according to his individual taste in playing the same, and I therefore wish it to be understood that when in my claims I employ the above expression, "elements of interpretation," I refer to one or more of the three elements which are mentioned above as being under the manual control of the musician while he is operating the piano-player. Furthermore, the individuality of a musician in playing by hand on a piano-keyboard is shown by his method of varying the time and the tone and by his use of the loud or sustaining and other pedals. The ultimate aim in the art of mechanical piano-player construction is to give the operator the same degree of control of these three elements of interpretation that he has in playing by hand and to so design the mechanisms for control that the manual movements of the operator shall as nearly as possible secure the same interpretative results as he would with playing by hand.

I do not limit myself to the particular mechanism shown, as various modifications thereof may be made without departing from the spirit of my invention. This remark is especially true of the connections between the levers 34 35 and the expression-boxes and other parts controllable by said levers; and I wish it to be clearly understood that any other construction or arrangement of parts in which a single lever may be used capable of movement in two different planes to govern two separate controls of a piano-player come within the scope of my invention.

By the term "expression-box" I do not necessarily mean a regulating mechanism of the type disclosed, but rather any suitable device for controlling the loudness or softness of the expression.

It will be noted that by the arrangement above described the mechanism as a whole is very compact and that the additional parts not found in the ordinary pianola occupy spaces otherwise idle, so that the cabinet employed need not be any larger than that ordinarily used.

Having thus described my invention, I claim as new and desire to secure by Letters Patent—

1. In a device of the character described, the combination of a main pneumatic, secondary pneumatics independently connected therewith for deflating the same, a valve for inflating said main pneumatic, and a common lever connected with both of said secondary pneumatics and with said valve, for actuating said valve and thereby inflating said main pneumatic when actuated by either of said secondary pneumatics.

2. In an apparatus of the character described, the combination of means for striking notes, a timing device, an expression-box, and mechanism connected with both said timing device and said expression-box, said mechanism being provided with a single manually-operated member controllable at will for varying both the time and expression of the notes.

3. In an apparatus of the character described, the combination of means for striking both theme and accompaniment notes, a timing device, an expression-box for said theme notes distinctively as such, and mechanism connected with both said timing device and said expression-box, said mechanism being provided with a single member, controllable at will, for governing both the expression of said theme notes and the time of said theme and accompaniment notes.

4. In an apparatus of the character described, the combination of means for striking both theme and accompaniment notes, an expression-box for said theme notes distinctively as such, and mechanism, controllable at will while the apparatus is in action, for governing, independently of each other, the expression of said theme notes as such and the time of the music as a whole.

5. In an apparatus of the character described, the combination of means for striking both theme and accompaniment notes, an expression-box for controlling the expression of said theme notes independently of said accompaniment notes, a timing device for both theme and accompaniment notes, and means for controlling at will, while the device is in action, both said expression-box and said timing device.

6. In an apparatus of the character described, a volume expression-box, and a tempo device in combination with mechanism for actuating the same independently, said mechanisms being provided with a single manually-operated member whereby they may be actuated independently of each other.

7. In an apparatus of the character described, the combination of means for striking notes, a horizontal shaft capable of sliding movement in the direction of its axis, and of rocking movement upon its axis, a crank-arm mounted slidably upon and receiving angular movement from the rocking movement of said shaft, a tempo-box operated by said sliding movement of said shaft, an expression-box governing the strength with which the notes are struck, said expression-box being operated by said rocking movement of said shaft and said angular movement of said crank-arm, and a single manually-operated lever rigidly attached to said shaft for operating said tempo-box by a lateral movement of said lever, and for operating said expression-box by an angular movement thereof.

8. In an apparatus of the character described, the combination of means for striking notes, a horizontal shaft capable of sliding movement in the direction of its axis and of rotation upon its axis, a crank-arm mounted slidably upon and receiving angular movement from the rotation of said shaft, connections to the "loud" pedal of the piano for operating the same by the horizontal movement of said shaft, an expression-box for governing the strength with which the accompaniment notes of the music are struck, said expression-box being operated by said rocking movement of said shaft and angular movement of said crank-arm, and a single manually-operated lever, rigidly attached to said shaft for operating said loud pedal by the lateral movement of said lever, and for operating said expression-box by the angular movement thereof.

9. In an apparatus of the character described, the combination of a single manually-operated lever capable of movement in two directions to govern a tempo-box and an expression-box respectively, two index-pointers connected with said lever, and a music-sheet containing a tempo-line and an expression-line, capable of being followed by said index-pointers respectively and simultaneously for the proper rendition of the tempo and the expression of the music.

10. In an apparatus of the character described, the combination of a tracker-board, air-controlled mechanism connected therewith for striking notes, an expression-box connected with said air-controlled mechanism, means for moving a music-sheet relatively to said tracker-board, and mechanism provided with a single manually-operated member, movable downwardly for controlling said expression-box, and movable laterally for governing the speed of said tune-sheet.

11. In a device of the character described, the combination of a tracker-board, air-controlled mechanism connected therewith for striking notes, a volume-of-sound expression-box and a tempo device, a shaft adapted to rock on its axis and also to slide in the general direction of the same, connections from said shaft to said tempo device whereby said shaft, when moved in the general direction of its axis may actuate said tempo device, and other connections from said shaft to said volume-of-sound expression-box, so that the latter may be actuated by the rocking movements of said shaft, and means for actuating said shaft.

12. In an apparatus of the character described, the combination of a main pneumatic for striking a note, a main exhaust for actuating said pneumatic, a pair of expression-boxes, a pair of exhaust-boxes connected with said expression-boxes and controllable thereby, a pair of secondary pneumatics each actuated by one of said exhaust-boxes and provided with a valve adapted to open and close communication between said main pneumatic and said main exhaust-chamber through one of said expression-boxes, a single valve for venting said main pneumatic after each note is struck thereby, a connection from said last-mentioned valve to both valves of said pair for enabling either of said valves to actuate said single valve, and means for actuating said secondary pneumatics so as to operate independently the valves of said pair.

13. In an apparatus of the character described, the combination of a main pneumatic for striking a note, a main exhaust-chamber for actuating said main pneumatic, a plurality of expression-boxes, a plurality of exhaust-boxes connected respectively with said expression-boxes, a plurality of secondary pneumatics each actuated by one of said exhaust-boxes and provided with a valve adapted to open and close communication between said main pneumatic and said exhaust-chamber through one of said expression-boxes, a single valve for venting said main pneumatic after each note struck thereby, said single valve being disposed intermediate of said first-mentioned valves, a single lever connected with all of said valves to enable each of said first-mentioned valves independently of the other to actuate said single valve, and means for separately actuating said secondary pneumatics, for the purpose of opening and closing said first-mentioned valves independently.

In testimony whereof I have signed my name to this specification in the presence of two subscribing witnesses.

JOHN B. WALKER.

Witnesses:
   Jno. M. Ritter,
   A. A. Hopkins.